US008849919B2

(12) United States Patent
Gerstl et al.

(10) Patent No.: US 8,849,919 B2
(45) Date of Patent: Sep. 30, 2014

(54) SPACE-EFFICIENT MAIL STORING AND ARCHIVING BASED ON COMMUNICATION STRUCTURE

(75) Inventors: Peter Gerstl, Holzgerlingen (DE); Magnus Karlsson, Zurich (CH); Dirk Seider, Grosselfingen (DE); Oliver Suhre, Stuttgart (DE)

(73) Assignee: International Business Machines Corporation, Armonk, NY (US)

( * ) Notice: Subject to any disclaimer, the term of this patent is extended or adjusted under 35 U.S.C. 154(b) by 1186 days.

(21) Appl. No.: 11/325,022

(22) Filed: Jan. 3, 2006

(65) Prior Publication Data

US 2006/0190830 A1   Aug. 24, 2006

(30) Foreign Application Priority Data

Feb. 4, 2005  (EP) .................................... 05100780

(51) Int. Cl.
- *G06F 17/30* (2006.01)
- *G06Q 10/10* (2012.01)
- *H04L 12/58* (2006.01)

(52) U.S. Cl.
CPC ............ *G06Q 10/107* (2013.01); *H04L 12/586* (2013.01); *H04L 51/22* (2013.01); *H04L 51/063* (2013.01); *H04L 51/16* (2013.01)
USPC ......................................................... 709/206

(58) Field of Classification Search
USPC ........... 715/752; 709/204–207; 707/100–101, 707/204
See application file for complete search history.

(56) References Cited

U.S. PATENT DOCUMENTS

| | | | | |
|---|---|---|---|---|
| 4,754,487 A | * | 6/1988 | Newmuis | 382/118 |
| 5,488,364 A | * | 1/1996 | Cole | 341/50 |
| 6,584,564 B2 | * | 6/2003 | Olkin et al. | 713/152 |
| 6,615,365 B1 | * | 9/2003 | Jenevein et al. | 714/6.11 |
| 6,633,399 B1 | * | 10/2003 | Fukazawa | 358/1.15 |
| 6,640,301 B1 | * | 10/2003 | Ng | 713/156 |

(Continued)

FOREIGN PATENT DOCUMENTS

| | | |
|---|---|---|
| EP | 1085444 A | 3/2001 |
| JP | 2000194617 A * | 7/2000 |
| WO | WO 0067133 A1 * | 11/2000 |

OTHER PUBLICATIONS

Extended European Search Report for application # 06100935.3, dated Jun. 12, 2006.

*Primary Examiner* — Andrew Goldberg
(74) *Attorney, Agent, or Firm* — Kali Law Group, P.C.

(57) ABSTRACT

The present invention relates to electronic mail. In particular, it relates to a method and system for processing electronic mail, wherein mails are stored in a space efficient way by removing redundancy from the content. Prior art is known for doing a limited version of this on a mail client.

In order to provide a method and system which is adequate for server operation it is proposed to perform the steps of: splitting the content of an incoming e-mail into elementary mail segments by parsing and optionally normalizing the e-mail body based on a regular grammar with transduction rules; computing a unique ID for each elementary mail segment; storing the normalized or original form of an elementary mail segment together with a link to its respective parent elementary mail segment in a table in a way retrievable by said unique ID; and reconstructing an original e-mail from a concatenation of a respective sequence of said elementary mail segments wherein the unique ID for each elementary mail segment is used as a key for accessing said table and retrieving the respective elementary mail segment.

13 Claims, 10 Drawing Sheets

(56) References Cited

U.S. PATENT DOCUMENTS

| | | | |
|---|---|---|---|
| 6,675,197 B1 * | 1/2004 | Satoh et al. | 709/204 |
| 6,704,772 B1 * | 3/2004 | Ahmed et al. | 709/207 |
| 6,795,819 B2 * | 9/2004 | Wheeler et al. | 707/691 |
| 7,089,320 B1 * | 8/2006 | Biederman et al. | 709/234 |
| 7,167,825 B1 * | 1/2007 | Potter | 704/9 |
| 7,299,357 B2 * | 11/2007 | Karamchedu et al. | 713/171 |
| 2002/0037035 A1 * | 3/2002 | Singh | 375/240 |
| 2002/0073117 A1 * | 6/2002 | Newman | 707/513 |
| 2002/0112008 A1 * | 8/2002 | Christenson et al. | 709/206 |
| 2002/0122543 A1 | 9/2002 | Rowen | |
| 2003/0006919 A1 * | 1/2003 | Collins et al. | 341/87 |
| 2004/0039808 A1 * | 2/2004 | Ohara | 709/223 |
| 2004/0044735 A1 | 3/2004 | Hoblit | |
| 2005/0076031 A1 * | 4/2005 | Xu et al. | 707/9 |
| 2005/0192998 A1 * | 9/2005 | Dittrich et al. | 707/102 |
| 2005/0283461 A1 * | 12/2005 | Sell et al. | 707/1 |

* cited by examiner

INVENTIONAL

EXEMPLARY KEY

From: alice@domain1
To: chris@domain3, bob@domain2,
    deirdre@domain4
Subject: Re: Hi I'm fine. Thanks

← 41

← 43

From: chris@domain3
To: alice@domain1, bob@domain2,
    deirdre@domain4
Subject: Re: Hi Not too bad. And you?

← 45

← 44

From: |alice@domain1|  ←— 46A

To: |bob@domain2, chris@domain3,
     deirdre@domain4|  ⤢ 46

Subject: |Hi|  46B

46C

|How are you?|  46D

FIG. 5

Figure 9D:
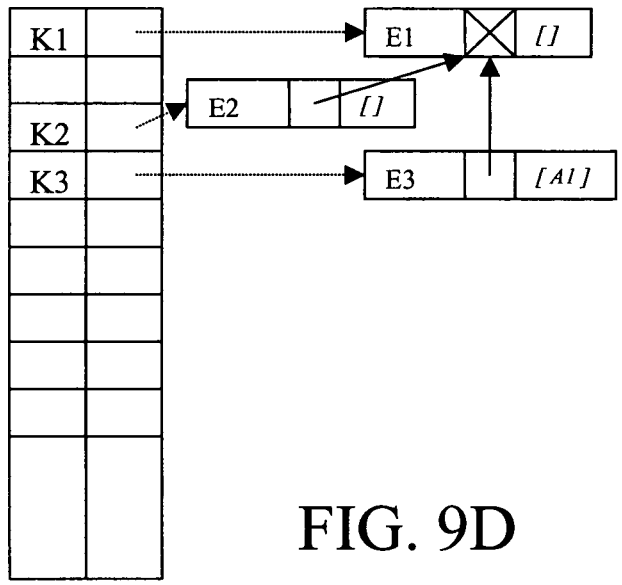
Figure 9E:
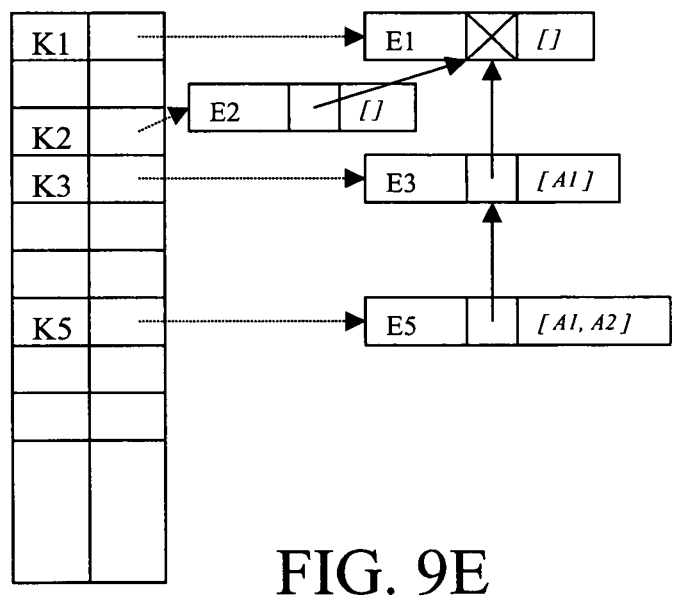
Figure 9F:
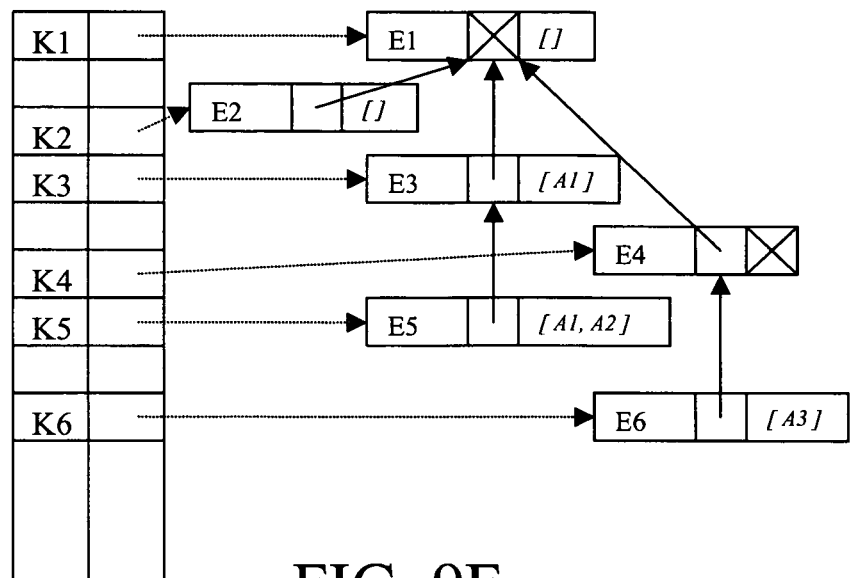
Figure 9G:
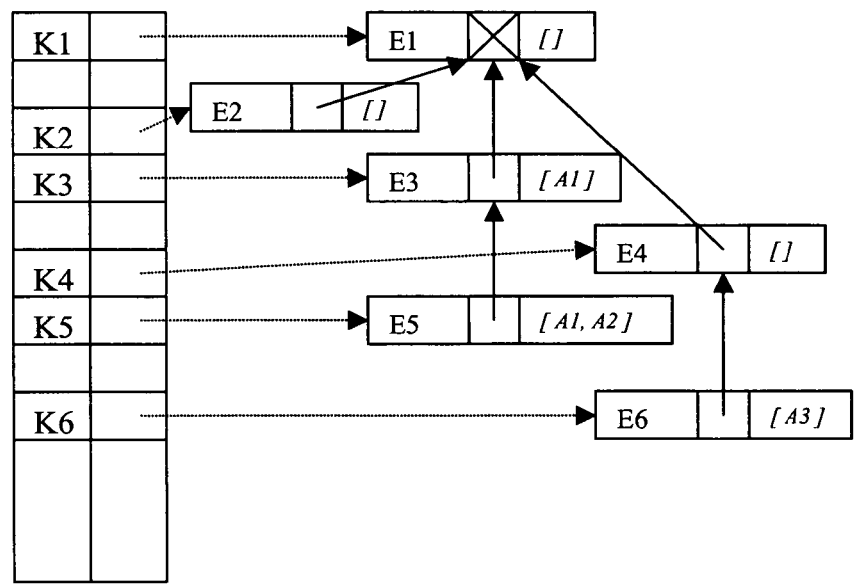

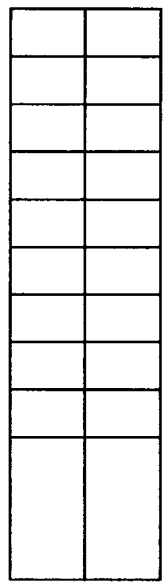
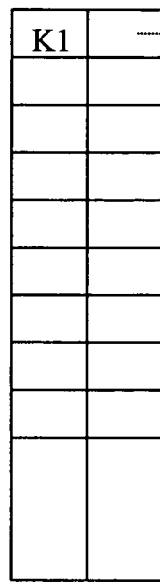
FIG. 9A  FIG. 9B
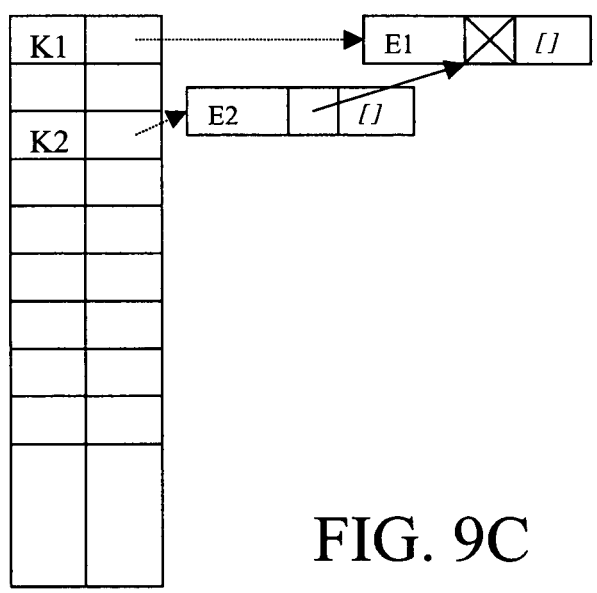
FIG. 9C

SPACE-EFFICIENT MAIL STORING AND ARCHIVING BASED ON COMMUNICATION STRUCTURE

CLAIM OF PRIORITY

This application claims the foreign priority benefits under 35 U.S.C. §119 of European application No. 05100780.5 filed on Feb. 4, 2005, which is incorporated herein by reference.

1. BACKGROUND OF THE INVENTION 1.1 Field of the Invention

The present invention relates to electronic mail. In particular, it relates to a method and system for processing electronic mail, wherein mails are stored in a space efficient way by removing redundancy from the content.

1.2. Description and Disadvantages of the Prior Art

Figure 1:
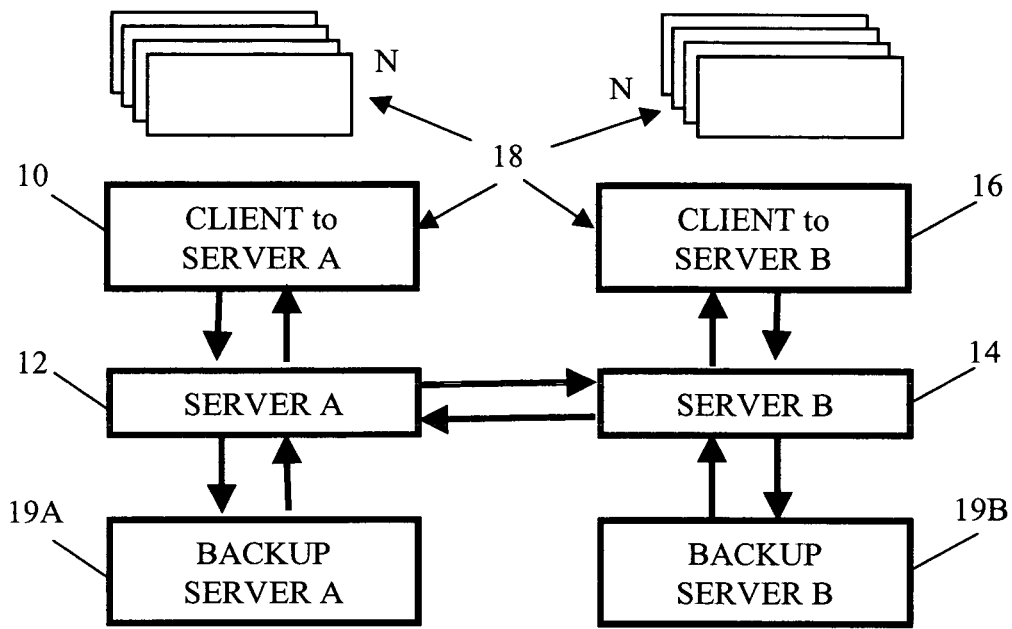

A prior art mail system structure is given in FIG. 1 in a rough overview form. A client 10 to a mail server A 12 sends and receives mails to and from, respectively, a mail server B 14 and a client 16 to server B.

US patent application publication No. US 2004/0044735 A1 discloses a prior art e-mail processing method and system, which is intended to remove redundancy in an e-mail thread. It works at the client side exclusively. On client side a new mail is created wherein redundant parts are eliminated by a compare process, which is based on a text compare, and on a header compare procedure. It is cited there from as follows:

First, the plurality of e-mail messages are compared with each other, via step 410. Preferably, a comparison program is utilized to compare the plurality of email messages with each other. Next, a portion of at least one of the plurality of email messages is removed that is duplicative of a portion of another of the plurality of email messages, via step 420.

The comparison program implemented by the method in accordance with present invention can compare the text of the email message, the headers of the email messages, or any of a variety of parameters present within the email message in order to minimize the redundancy between email messages. Accordingly, one of ordinary skill in the art will readily recognize that a variety of implementations could be employed to compare the email messages while remaining within the spirit and scope of the present invention." (end of prior art citation).

This prior art method is performed at the client side, as indicated by the circles 18. Generally, a huge amount (N) of different clients are connected to a single mail server. This however, might be regarded in many cases disadvantageous compared to a server-side doing, as the mail servers have usually the additional job to provide a respective backup/archiving server 19A, 19B with the data to be stored. Thus, it would be more advantageous to remove redundancy already at the server, as this would save enormous amounts of storage space during normal operation and backup, and would reduce the traffic between each client (N often greater than 100,000) and its mail server. This aspect is of increasing importance due to increasing legal obligations imparted on the handling of e-mails regarding documentation and liability purposes in business, and due to the general tendency to do more and more communication in an electronic way.

Disadvantageously, this prior art method does not disclose details on how a compare process is performed in detail, and which mails are to be compared with each other. Further, no precise disclosure is given what has to be done if no doubtless decision is obtainable out of the compare step.

Further, it cannot be implemented at a mail server 12 or 14 for working effectively, where mails from thousands of different mail senders are to be compared with thousands of different mail receivers because a plain text compare combined with preceding header field analysis is not an effective means to decide, which mails belong to the same e-mail thread.

1.3 Objectives of the Invention

It is thus an objective of the present invention to provide a method and system, which is adequate for server operation.

2. SUMMARY AND ADVANTAGES OF THE INVENTION

This objective of the invention is achieved by the features stated in enclosed independent claims. Further advantageous arrangements and embodiments of the invention are set forth in the respective subclaims. Reference should now be made to the appended claims.

In order to provide a method and system which is adequate for server operation it is proposed to perform a particular storage procedure in the following steps a) to d), and a particular, respective reconstruction procedure in step e), i.e. a sequence of the steps as follows:

a) In a first step splitting the content of an incoming e-mail, which is referred to herein also as the "original" e-mail, into elementary mail segments by parsing and optionally normalizing the e-mail body based on a regular grammar with transduction rules. A transducer implementing this grammar detects split points that indicate that the body of this mail contains representations of other e-mails. It uses a combination of basic rules, mail-system specific extensions and heuristics to identify the portions within the e-mail body that represent elements of an e-mail thread. Two consecutive elements of an e-mail thread are said to be instances of a parent-child relationship, preferably, if they rely on either a reply-to or forward relationship. In the following we use the term reply-to relationship for both of these relations;

b) in a second step computing a unique ID for each elementary mail segment, wherein said ID is used as an index for accessing a mail store table;

c) then looking up the computed ID of each elementary mail segment in said table;

d) finally, in case the computed ID of an elementary mail segment does not exist in said table (30), storing the respective elementary mail segment as a new entry in said table together with a link to its particular parent elementary mail segment, thus defining one or more ordered sequences of inter-related elementary mail segments;

e) The original mail is reconstructed by concatenating the corresponding sequence of said inter-related elementary mail segments (41, 45, 46) for display purposes at a mail-receiving client (10; 16), or for a restore procedure from a mail archive based on said mail store table.

Thus, in simple, short words, each incoming e-mail is analyzed, and particular sections of its message body, namely only so-called elementary mail segments are stored in a particular way and using a particular effectively accessible data structure. The advantage is that this mail server based storage mechanism significantly reduces redundancy compared to prior art server-based storage, as at a prior art mail server the overall content of stored mails is full of redundancy. Then, the mail server sends to the addressee a concatenation of such elementary segments, based on the stored contents. A long-term archive is correspondingly based on said redundancy-reduced storage of mails.

The use of normalized versus original forms during splitting is a tradeoff between compression rate and the ability to guarantee that reconstructed e-mails look exactly the same way as the original mail.

Normalization can be used to undo transformations or remove artifacts created by the forwarding e-mail system. In a heterogeneous environment where different e-mail systems are used in environments that may have different locales, normalization can help to identify a larger number of elementary e-mails as being identical. If normalization is not used, some elementary e-mails that are in fact identical may lead to different unique IDs if for example the e-mail systems from which they originated use a different header representation within the body of the forwarding e-mail, so they are treated as if they were different mails. In the following we will refer to normalization keeping in mind that this is an optional step.

Split points are determined based on a regular grammar. A transducer processing the body of an incoming e-mail based on such a grammar identifies split locations and optionally normalizes the elementary mail segments between these split locations. The purpose of normalization is to remove artifacts created or transformations done by the e-mail system from which the preceding mail originated. When replying to an e-mail A with a new e-mail B, the originating e-mail system may decide to represent the header or body of A in an arbitrary way within the body of B. It may, for example, remove some of the header fields, use the originating platform's specific locale to represent the names of the header fields or decide to prefix each line of A with a '>' symbol. The key, which is intended to uniquely represent an elementary mail segment, is calculated by the system based on this normalized representation.

A transducer implementing this grammar detects split points that indicate that the body of this mail contains representations of other e-mails. It advantageously uses a combination of basic rules, mail-system specific extensions and heuristics to identify the portions within the e-mail body that represent elements of an e-mail.

The mail server is able to reconstruct the original form of an elementary e-mail by looking up the elementary mail segments contained in its body based on the key and replacing the key with the text of the stored elementary mail segment. This use of this method by a mail system can be made transparent to the client if the server re-constructs a mail to its original form before sending it to the client. Alternatively, a client may retrieve the 'compressed form' of a mail that contains links referring to the elementary mail segments in its content. By clicking a link or other graphical navigation means, the user can expand the mail history as needed.

If a reply-to relationship remains undetected or split locations are located improperly, this does not impact the proper re-construction of original e-mails. The only impact this has is on the compression rate since not being able to identify some elementary mail segments as identical increases the number of e-mails that need to be stored.

3. BRIEF DESCRIPTION OF THE DRAWINGS

Figure 2:
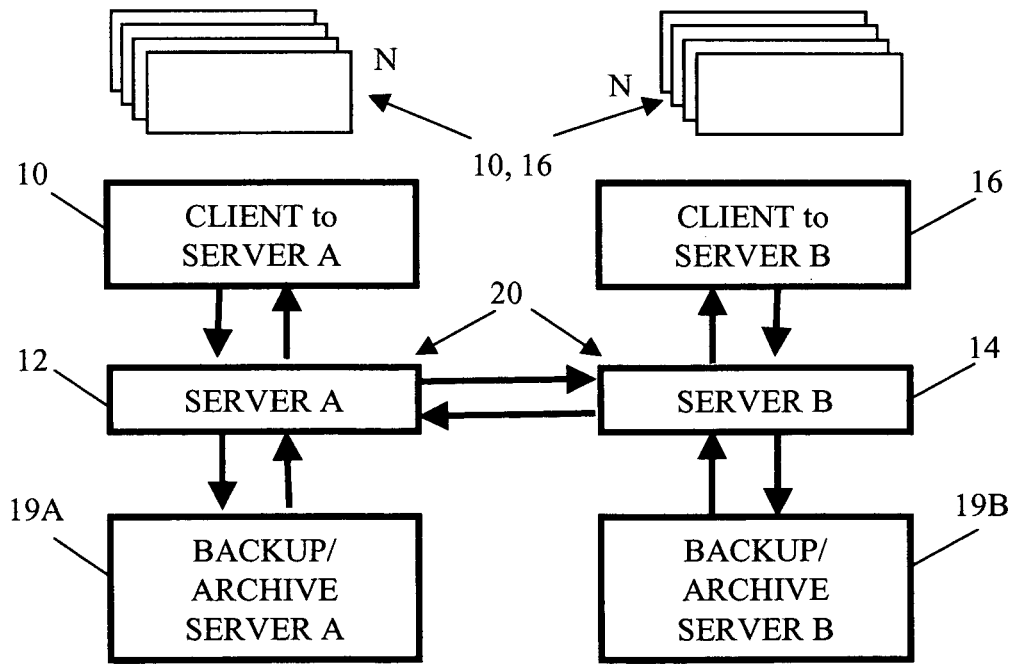
Figure 3:
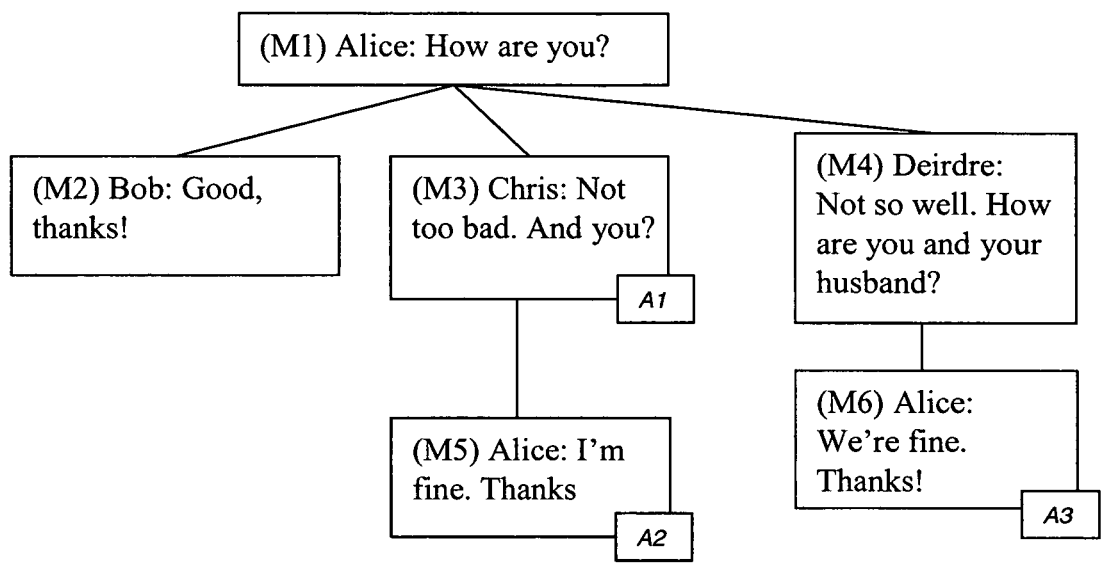
Figure 4:
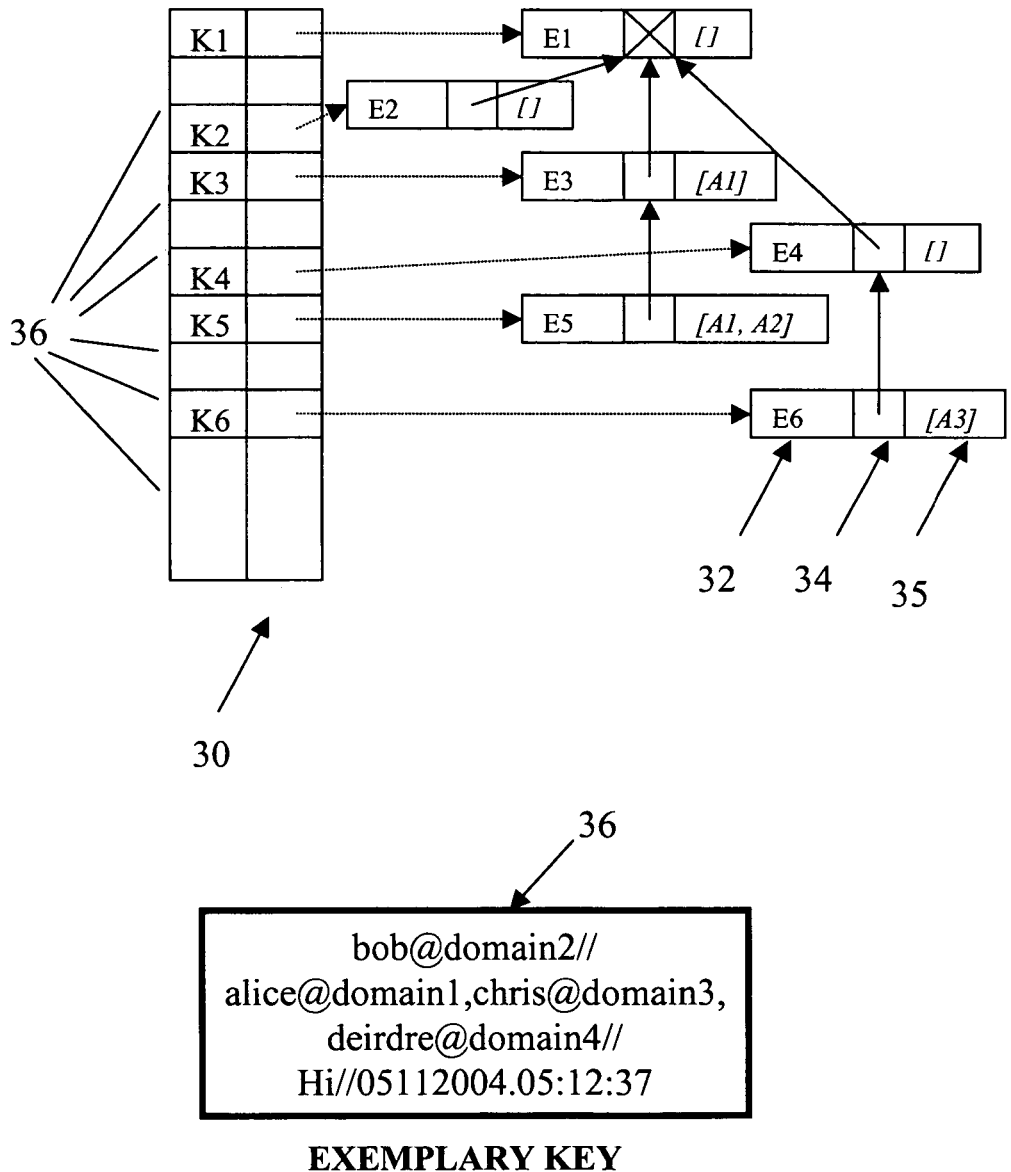
Figure 6:
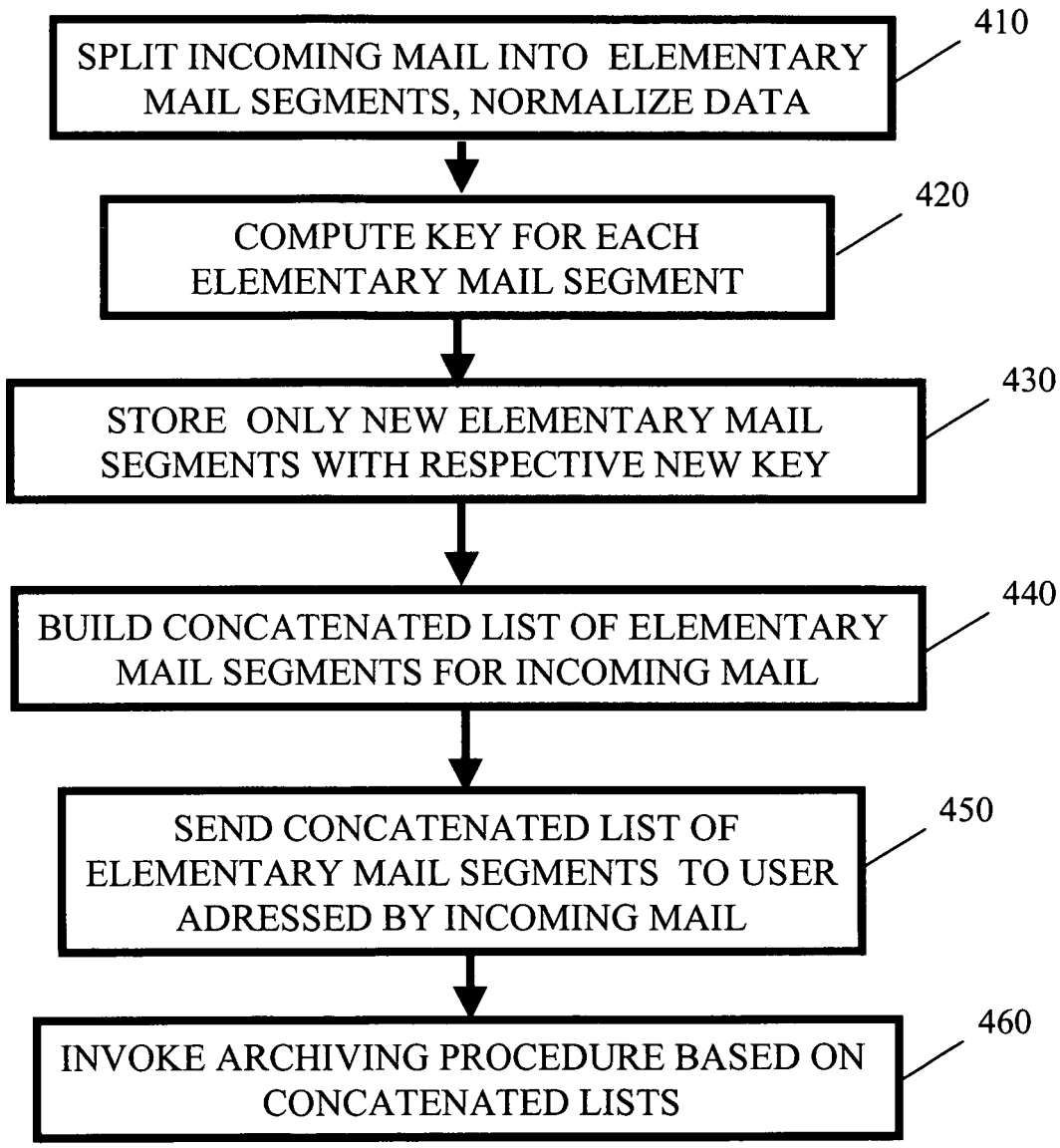
Figure 7:
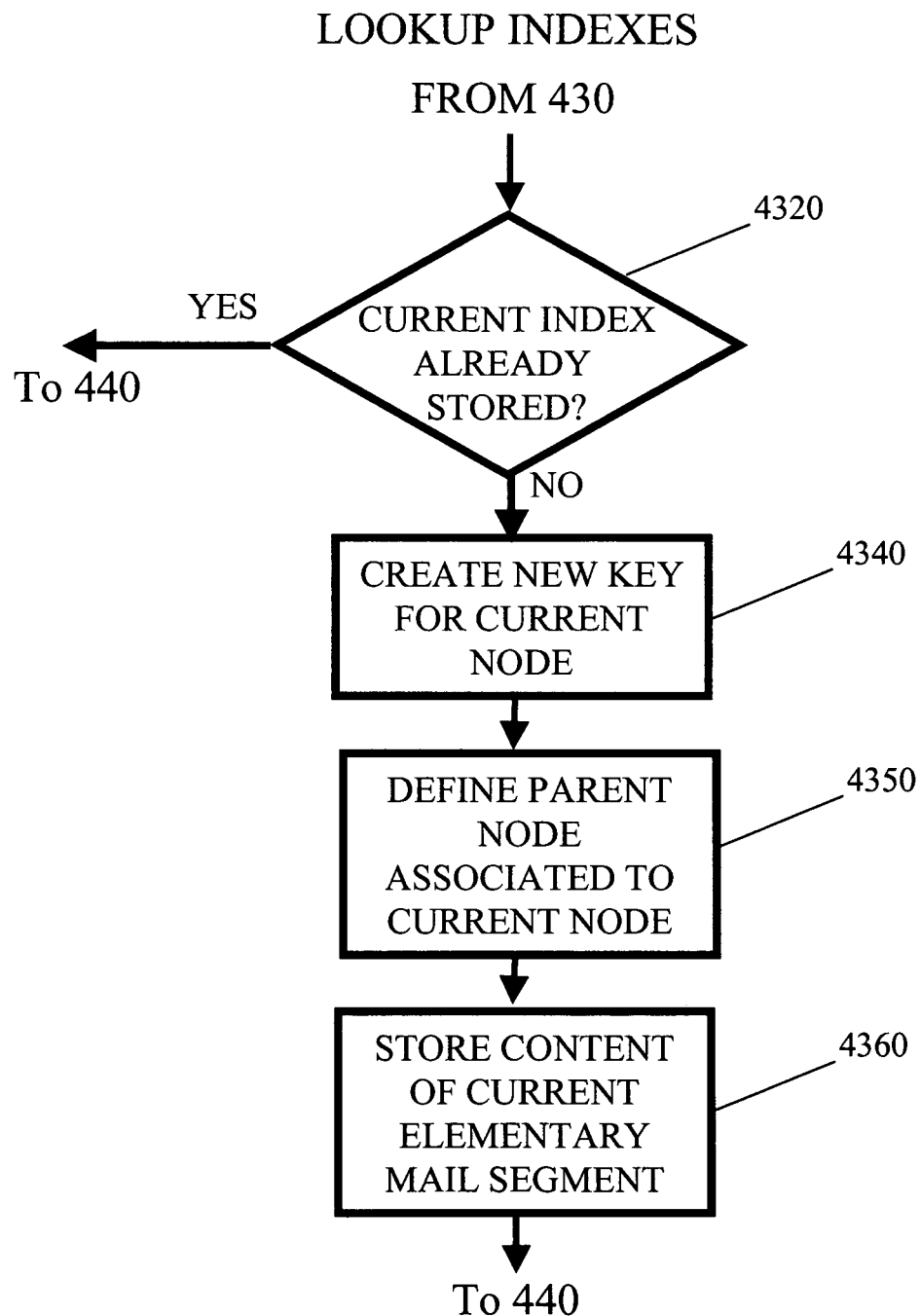
Figure 8:
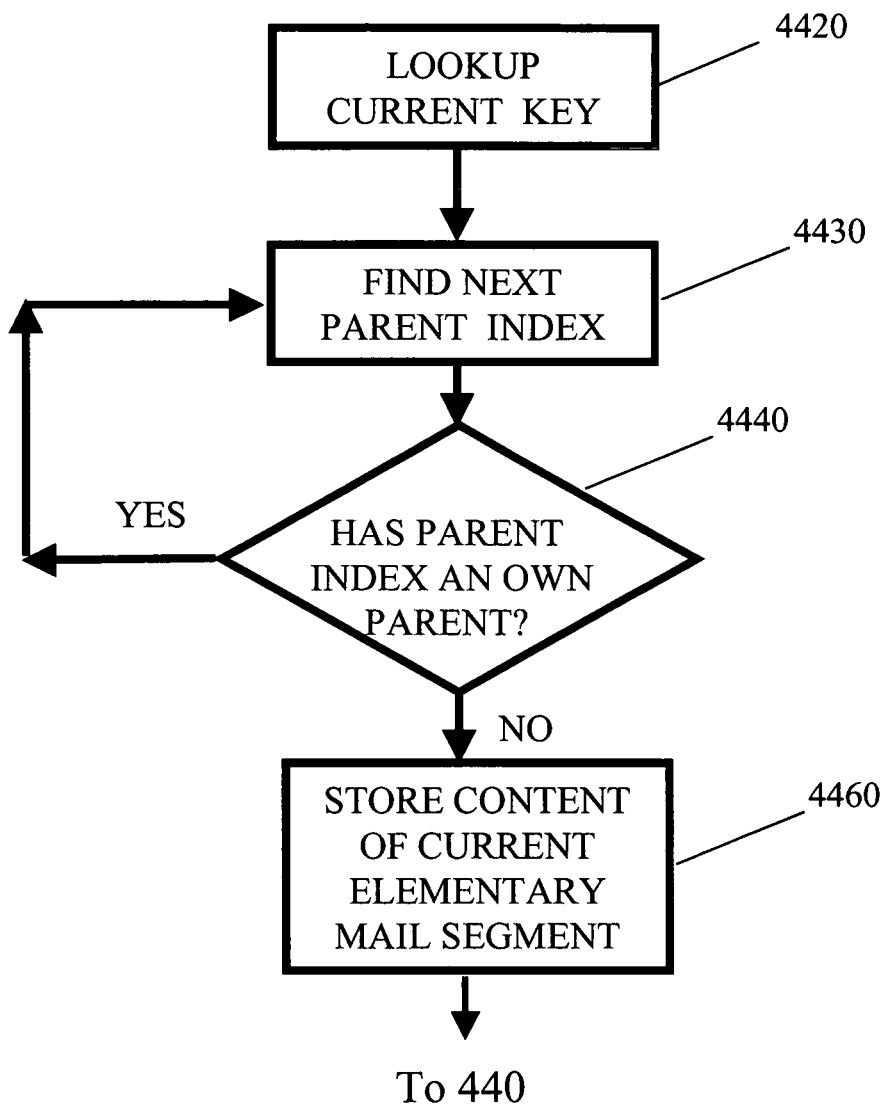

The present invention is illustrated by way of example and is not limited by the shape of the figures of the drawings in which:

FIG. 1 is a prior art e-mail system overview representation,

FIG. 2 is an e-mail system overview representation according to the invention, FIG. 3 is a schematic tree diagram representing an e-mail thread initiated by a single e-mail M1, FIG. 4 is a schematic tree diagram of the basic storage structure used in a preferred embodiment of the present invention, FIG. 5 is a schematic sketch of an e-mail incoming at a mail server, and a sketch of respective header fields and contents thereof, FIG. 6 is a schematic control flow diagram of a method according to a preferred embodiment of the present invention, FIG. 7 and FIG. 8 are each a schematic control flow diagram of a method according to a preferred embodiment of the present invention, showing details of FIG. 6, and FIGS. 9A to 9G are mail store table diagrams developing during runtime.

4. INTRODUCTION TO THE PREFERRED EMBODIMENT

The preferred embodiment of the present invention basically requires the following steps:
 a) Splitting an e-mail into its elementary mail segments,
 b) Computing an ID for each elementary mail segment, and using it for accessing a mail store table,
 c) in case, the same ID exists already in said table, the respective entry in said table is not overwritten, otherwise,
 d) Storing the elementary mail segments by using said ID, and
 e) Reconstructing the original e-mail.

In the following, we will introduce the algorithms performed during these steps.
a) Determination of Split Points With reference to the internal structure of an e-mail the format of internet mail is based on the ARPA standard RFC822 for internet text messages [ref.: http://www.w3.org/Protocols/rfc822/]. According to RFC822 an Internet message is a block of ASCII text that consists of a header followed by content (the body). The header is a sequence of fields and values separated by a colon:
 field=field-name ":" [field-body]
 (example: Subject: new product)

RFC1521 refines the notation of a message body by introducing the notion of content types. An important content type from the point of view of this invention is 'multipart' which allows a message body to consist of several parts separated by a configurable encapsulation boundary. One distinguished part is the e-mail body in the sense of a text message while the others are treated as attachments.

RFC822 and RFC1521 define the basis structure of messages which prior art common e-mail systems such as Microsoft Exchange, Lotus Notes, or Novell Groupwise need to comply with to ensure interoperability across the Internet. However, these standards are meant as recommendations, so actual messaging systems may treat some aspects differently.

A specific message system typically uses a different representation internally. However, since some information of the header is required for delivery of the mail, this information can be accessed and processed by any message system. Here is an example of a header as specified by RFC822:
 From: <fromFieldValue>
 To: <toFieldValue>
 Subject: <subjectFieldValue>

The situation is different when considering a discussion thread since all headers except the 'top-most' one are part of the message body, which a mail system may decide to represent in an arbitrary manner. We refer to the representation as used by the top-most header as the 'standard notation'. From the RFC822 point of view, the message body is a black box.

Next, the following example is used to illustrate how a message system may 're-package' an e-mail when including it in a forwarded or returned copy:

Assume Alice sends the following e-mail M1 to her friends Bob, Chris and Deidre:

M1:
From: alice@domain1
To: bob@domain2, chris@domain3, deidre@domain4
Subject: Hi
How are you?

Bob replies to Alice with a copy to Chris and Deidre. Bob's e-mail system creates a new e-mail M2 consisting of two elementary e-mails, one E1 corresponding to M1 and the new one, E2, containing Bob's reply:

M2:
From: bob@domain2
To: alice@domain1
Subject: Re: Hi
Good, thanks!
Sender: alice@domain1
To: bob@domain2
Subject: a question
How are you?

It should be noted that a representation of M1's header is an element of the unstructured body of M2. The subject field in the header of M2 contains a modified version of the original subject. Identifying elementary mail segments is based on a string comparison of M1 with the body of M2, is unfeasible due to the following problems:

When trying to locate both the header and body of M1 within the body of M2 one would not find a matching substring in the body of M2 since the element in M2's body that represents the original header of M1 has been modified by the messaging system (the "From:" field was replaced by the field "Sender").

When trying to locate the body of M1 there is no clear indication where the element begins that matches the body of M1 in M2. The situation is even worse when considering a message that consists of three or more elementary e-mails. In this case there is no clear indication where the representation of the body begins and ends. Furthermore, there is some risk that two elementary e-mails are considered the same though they are in fact different. As an example, consider an e-mail with the body "Hi Bob" that could have been sent by many different people.

The present invention addresses these problems as follows:
Preferentially, it uses a combination of three approaches described below in order to
a) identify elementary e-mails and
b) map relevant information from the representation of an e-mail header into a canonical format.

It defines an identity criterion, which specifies under which conditions two elementary mail segments are considered identical based on the canonical representation of the e-mail header and the corresponding content. This is achieved by the inventional key building procedure described below.

Although a single one of the inventional approaches alone may lead to useful results, the present invention uses advantageously a combination of the following approaches to identify elementary e-mails and to map relevant information from the representation of an e-mail header into a canonical format:

1. Support from the messaging system
2. Textual patterns
3. Heuristics
   Chapter 5 describes these approaches in detail.

b) Calculation of the Unique Id

The inventional method strongly relies on a key that identifies an elementary mail segment. Thus, the key is advantageously built out of discrete components of an elementary mail segment. The choice of these components defines when two elementary mail segments are considered identical. A set of components that does not uniquely represent an elementary mail segment may result in a higher hit ratio for the elementary mail segments, however, there also might be the risk of losing data.

For example, if only the contents of the mail will be taken to create the key, e.g. "How are you?", then the same or another person can send the same e-mail text to a different distribution list. The key, however, would be the same, because it is built from the textual mail contents only.

The increasingly important constraint of legal compliance for future e-mail application programs involves that mail data must not be lost due to a key collision resulting from too less of above components being stored in the key. For legal compliance in business fields having rigorous requirements all components available with an elementary mail should be used to generate the key:

All textual content of the header of the elementary mail.
The textual content consists of all heading information of the elementary mail, e.g. "from", all recipient lists as well as the subject.

If a date is present, this helps to identify the elementary mail even more unique.

The mail text of the message body itself. For mails with enriched text, the rich text should be part of the key to ensure that color coding, fonts, font styles and the like are part of the key.

Attachments are advantageously not considered as a part of the key.

If legal compliance is not needed, then a subset of the information mentioned above might be taken to enlarge the scope of the same elementary mails. This, however, might result in partly loss of information of certain elementary mails when viewed/restored again.

The key value itself can for instance be generated using a hashing algorithm like MD5 [ref.: RFC 1321], see for instance http://www.faqs.org/rfcs/rfc1321.html, or SHA [ref.: NIST, FIPS PUB 180-1: Secure Hash Standard, April 1995.] or others. The component values of an elementary e-mail as described above will be used as an input for such key generation. Normalization may be applied to ensure a consistent character encoding such as UTF-8 is used.

The appropriate set of elements for computing the ID should be selected depending on quality requirements. A small number of elements increase the risk of two mails being considered identical although they are in fact different. This risk may be acceptable where legal compliance is not an issue. If legal compliance is important, a larger set of elements should be selected.

Good combinations for computing an ID are:
From+To+a consistently defined time stamp or a plurality of time stamps. A time stamp can be selected from either of:
  sent by client of server A (created),
  sent by server A (routed),
  received by server B (received),
  received at client of server B (delivered).

If present in a globally consistent standard (e.g. Greenwich time), this can be used directly. If not present, respective time additions or subtractions can be calculated according to the location of a respective server on earth.

c, d) Storing Elementary Mail Segments

With general reference to the figures and with special reference now to FIG. 2 the mail servers 12 or 14 are depicted by 20 to implement the removal of redundancy in a centralized way compared to prior art.

Further, when redundancy is removed at servers 12, 14, as the inventional method is implemented there, the backup servers 19A or 19B need to store significantly less data amounts. This is very useful; when those servers 19A & 19B or other dedicated archiving servers are used for long-time archiving of e-mail correspondence.

With reference to FIG. 3, a short and simple example e-mail discussion is given for illustrating how elementary mail segments are stored according to the inventional method:

1. Alice writes an e-mail to Bob, Chris, and Deirdre saying "How are you?" (Let's call this e-mail M1)
2. Bob replies to M1 with "Good, thanks!" (M2)
3. Chris replies to M1 with "Not too bad. And you?" with attachment A1 (M3)
4. Deirdre replies to M1 with "Not so well. How are you and your husband?" (M4)
5. Alice replies to M3 with "I'm fine. Thanks" and adds attachment A2 (M5)
6. Alice replies to M4 with "We're fine. Thanks!" and adds attachment A3 (M6)

The contents of M1 through M6 as they appear on the mail clients are as follows where an abstract notation "Attachments: . . . " is used to represent optional multi-part elements of the e-mail body. This is not a literal part of the e-mail body. A single part body corresponds to the notation "Attachments: none":

M1:
From: alice@domain1
To: bob@domain2, chris@domain3, deirdre@domain4
Subject: Hi
How are you?
Attachments: none
M2:
From: bob@domain2
To: alice@domain1, chris@domain3, deirdre@domain4
Subject: Re: Hi
Good, thanks!
From: alice@domain1
To: bob@domain2, chris@domain3, deirdre@domain4
Subject: Hi
How are you?
Attachments: none
M3:
From: chris@domain3
To: alice@domain1, bob@domain2, deirdre@domain4
Subject: Re: Hi
Not too bad. And you?
From: alice@domain1
To: bob@domain2, chris@domain3, deirdre@domain4
Subject: Hi
How are you?
Attachments: A1
M4:
From: deirdre@domain4
To: alice@domain1, bob@domain2, chris@domain3
Subject: Re: Hi
Not so well. How are you and your husband?
From: alice@domain1
To: bob@domain2, chris@domain3, deirdre@domain4
Subject: Hi
How are you?
Attachments: none
M5:
From: alice@domain1
To: chris@domain3, bob@domain2, deirdre@domain4
Subject: Re: Hi
I'm fine. Thanks
From: chris@domain3
To: alice@domain1, bob@domain2, deirdre@domain4
Subject: Re: Hi
Not too bad. And you?
From: alice@domain1
To: bob@domain2, chris@domain3, deirdre@domain4
Subject: Hi
How are you?
Attachments: A1, A2
M6:
From: alice@domain1
To: deirdre@domain4, bob@domain2, chris@domain3
Subject: Re: Hi
We're fine. Thanks!
From: deirdre@domain4
To: alice@domain1, bob@domain2, chris@domain3
Subject: Re: Hi
Not so well. How are you and your husband?
From: alice@domain1
To: bob@domain2, chris@domain3, deirdre@domain4
Subject: Hi
How are you?
Attachments: A3

In a general prior art, as implemented in many e-mail solutions today, which do not consider reply/forward structure, all those contents are stored as-is, i.e. the contents of e-mail M1, M3, and M4 are stored more than once (in fact, M1 would be stored six times). In contrast thereto, the present invention stores this conversation in a much more space-saving manner without loss of information. According to the present invention a storage concept is preferred over prior art, which may be represented as a tree of elementary mail segments wherein, if an elementary mail segment X is the parent of elementary mail segment Y, this means that Y is a reply to X, or X was forwarded by e-mail Y. For our example, the tree denoting our example e-mail thread is sketched in FIG. 3.

With additional reference to FIG. 4 the basic data structure needed on the e-mail server according to a preferred embodiment of the invention is a table 30, mapping a key 36 to a bucket of nodes—for instance a classical hash map, referred to further as "mail store table".

In turn, a node consists of the following fields:
1. The (textual) content E of the elementary mail segment, field 32;
2. A pointer to another node (can possible be NULL), field 34;
3. A list of attachment IDs, field 35.

In this particular embodiment attachments are assumed to be managed by a separate software component which, given an attachment, computes a unique ID—symbolically denoted in FIG. 4 as A1, A2, A3, etc.—for this attachment and which stores the actual attachment content and establishes a mapping from attachment IDs to the actual attachment content. More general aspects of the handling of e-mail attachments can be applied as known from prior art to the inventional method.

The pointer component 34 points to the parent of the elementary e-mail in the discussion thread tree. The purpose of the mail store table is to find out for a given key efficiently—even in large masses of e-mails managed at the mail server—if the elementary e-mail the key was computed from is already stored, and to provide quick access to this stored elementary mail segment. For the example given above, the filled mail store table looks like FIG. 4, where the entries are moved symbolically to the right in order to illustrate the tree-like structure. The attachment list 35 of a node indicates all attachments of the complete e-mail, which ends with this node. It does not contain the attachments of this elementary mail segment only since, in the case of RFC822 e-mails, it is not possible to find out which attachment belongs to which elementary mail segment. Note that, in the case where no such attachment table is present, this actually means that the attachments for the e-mail ending with the elementary mail segment represented by this node are not (yet) known. This can happen in the case, where a reply to an e-mail X was requested to be stored and X will be stored later or even never (if, for example, the e-mail is lost). In an e-mail archiving scenario implemented under inclusion of the inventional method, this would be not disadvantageous because one can only retrieve those e-mails from the archive, which were actually requested to be stored.

e) Reconstruction:

Given the ID of an elementary mail segment one can reconstruct its corresponding original email with reference to FIG. 8 as follows:

1. look up the entry in the mail store table associated with this ID,
2. look up its parent elementary mail segment and append it,
3. repeat step 2 until the parent link is null.

As multiple trees are stored, each tree being associated with a single e-mail thread, a "forest" is created. The steps and data structures necessary to build this forest are described in chapter 5 below with reference to FIGS. 6, 7 and 8.

5. DETAILED DESCRIPTION OF THE PREFERRED EMBODIMENT

This section describes the basic steps of this invention in more detail. As indicated in chapter 4, there are three basic operations 5.1. Splitting the Message Body The message body of the incoming e-mail M is split into its elementary mail segments E1, . . . , En, step 410 in FIG. 6.

An incoming e-mail is processed by the Splitter/Normalizer that parses the e-mail body to detect split points between elementary e-mails and optionally normalize the header and/or body of these elementary e-mails. The Splitter/Normalizer typically uses a combination of the following three approaches:

Approach 1: Support from the Messaging System

This first approach assumes that the messaging system uses an internal representation that considers the e-mail body as a structured entity. Within the spirit of RFC882 this could be reflected externally by a certain type of marker (string or non-printing character) that is unlikely to occur in the body of an elementary mail segment. This marker is not considered part of the e-mail body. Alternatively, any type of potentially vendor-specific rich text format can be used to represent the internal structure of an e-mail body. Unfortunately, some or even all of this structure may be lost when a message leaves the closed world of this vendor's messaging system. To give an example: an e-mail sent internally within a company that uses Lotus Notes as their company-wide messaging system will be treated as rich text preserving all internal information as long as it passes Lotus Notes servers. As soon as it leaves the company's intranet to a non-Lotus-Notes-based messaging system, the final Lotus Notes server converts the rich text format to a format which other messaging systems are likely to understand (plain text or HTML mail). As a side effect, much of the structure from the rich text format is lost in favor of compatibility.

Approach 1 is applicable if some kind of internal structure (for example encoded by a rich text format) exists for all mails in the area of interest that eases the identification of elementary mail segment in a message body. Though this may not be applicable for mails taking arbitrary routes through the internet, it may be a valuable option if a significant subset of the mails at issue were based on a single vendor's enhanced infrastructure (as is typically the case with a large company's intranet).

The following e-mail is an example of an XML-encoded representation of M2's body. XML is used for illustration purposes. This example represents an arbitrary structured format that contains an explicit notation of split points. A specific e-mail system may use some rich-text type of format to encode split points or a future standard may enrich the message format by means to express embedding of mails in a mail body. Given such situation, the present invention would be very well applicable and extendable in order to take profit of such standardization. In such scenario a "fictive" element "ThreadSeparator" from the name space 'mail' is assumed to be used to indicate a border between different elementary mail segments. Such border is referred to herein also as split location or split point.

```
<mail:Body>
Good, thanks!
<mail:ThreadSeparator />
<mail:Header>
    <mail:Originator>alice@domain1</mail:Originator>
    <mail:Recipient>bob@domain2</mail:Recipient>
    <mail:Recipient>chris@domain3</mail:Recipient>
    <mail:Recipient>deidre@domain4</mail:Recipient>
    <mail:Subject>Hi</mail:Subject>
</mail:Header>
<mail:Body>
How are you?
</mail:Body>
</mail:Body>
```

From a technical and performance-oriented point of view this is the most attractive approach since it takes advantage of information that is available the first place. However, message systems do not support this in general today and there is no agreed-upon standard on the use of such markers. Therefore, as mentioned before, this approach will typically only be applicable to a subset of the e-mails to be processed. However, for larger companies with a homogeneous single-vendor e-mail infrastructure this may be a significant portion.

Approach 2: Textual Patterns

This second approach addresses the heterogeneous nature of a real world message environment. It is based on the assumption that representations of e-mail headers in the body of an e-mail can be identified by a text pattern that can be described by a formal language such as regular expressions. The rule set of such a language may be created manually or by a 'statistical learning' process based on the analysis of an existing set of representative e-mails. Though this approach can be used to parse rich text representations of an e-mail body (approach 1) it is a lot more powerful. It can, for example be used to identify headers of the type:

To: <messageAddress>
From: <messageAddress>
where <messageAddress> may be represented in standard mail or in a X.500 (or LDAP) type of syntax as for example used internally by Lotus Notes:

```
<messageAddress> = <addressee> "@" <domain>
<messageAddress> = "CN=" <common name> "/OU="
                   <organizationalUnit>
where <addressee>, <domain>, <common name>,
<organizatinalUnit> represent strings built from certain
types of characters.
```

Furthermore, this approach solves some of the problems mentioned at the beginning of this section by treating the name of the originator field as an optional element of the header:

```
<headerRepresentation> = <fromField> <nl> <toField> <nl>
                         <subjectField>
<fromField> = ["From: "] <message address>
<toField> = "To: " <message address>
<subject>... . string build from certain types of characters
<nl> ... line break
```

This approach can also be used in a multi-language environment to identify the different language-specific translations of a field name, as for instance "De" as a French translation of "From", with a pattern such as:
<fromFieldName>="From: "|"Absender: "|"De:"|| . . .

Patterns may be created manually by analyzing a set of representative e-mails and identifying the different ways in which header information is represented in the body of an e-mail.

Alternatively, a learning algorithm can be applied that automatically identifies variants based on an initial seed.

Regular expressions can be processed efficiently by finite state machines or transducers (special versions of finite state machines that produce output while parsing the input).

Using a transducer covers the mapping to a normalized header format as it may, for example, map the different foreign-language translations of the "from" field, and other header fields into the standard format ("From:", "To:", "Subject:") and remove any unnecessary blanks. Thus, such a normalized form can have a table-like structure or may be determined to comply to a fixed format, which is easily to be evaluated by a program algorithm.

Approach 3: Heuristics

This third approach takes advantage of additional clues that may be available in the body of an e-mail when looking at it from a more general perspective. An example is taking advantage of relations between the representations of different headers in an e-mail body such as:
  Similarities in the subject field (e.g. subjects in an e-mail thread are the same except, for example a prefix, of type 'Re:').
  An elementary e-mail may be preceded by a sequence of '>' symbols (Unix mail client style of forward/response markup). However, this criterion only applies if the same prefix consisting of the same number of '>' symbols precedes the whole elementary e-mail.
  Fields with the prefix "Resent-" (for example "Resent-From:") indicate that the body contains an e-mail that is specified by the corresponding header fields with the "Resent-" prefix removed.
  The sender of an e-mail message in the thread typically is (one of) the recipient(s) of the message immediately preceding it in a chronologically ordered thread.

The example given herein helps to understand how this works:
M2 consists of the two elementary e-mails E1 and E2. The subject fields of E1 and E2 are related as follows:
  The value of E2's subject field=the value of E1's subject field preceded by
  "Re:"
Sender/Recipient relations are as follows:
  The e-mail address of the recipient of E1 (bob@domain1) is the e-mail address of the sender of E2.

The three approaches are advantageously used in combination since they cover different aspects of the e-mail separation problem. While approach 1 covers the well-defined rich text formats of a company's intranet, approaches 1 and 3 are used to maximize the identification rate for cases of unknown or only partially known formats, occurring when messages pass arbitrary routes through the Internet. Heuristics may be used to pre-process messages before they are processed by the transducer implementing approach 2 (removal of leading '>' characters) or they can be used to select plausible split points from an already normalized result.

In a preferred implementation the inventional e-mail system identifies the part representing the mail text (message body) in a multi-part e-mail and hands it over to a software component referred to herein as "Splitter/Normalizer", which uses a transducer to identify split points between elementary mail segments and to map each elementary mail segment to its normalized form based on a set of rules that looks as follows:

```
<e-mail> = <elementary> [<elementary>]*
<elementary> = <headerRepresentation> [<nl>]*
               <bodyRepresentation>
<headerRepresentation> = <fromField> <nl> <toField> [<nl>
                        <ccField>] [<nl> <subjectField>]
<fromField> = [<fromFieldName> ":" <bl>] <message address>
<fromFieldName> = "From" | "from" | "FROM" | "Absender" | ...
<toField> = [<toFieldName> ":" <bl>] <message address list>
<toFieldName> = "To" | "to" | "TO" | "Empfaenger" | ......
<ccField> = <ccFieldName> ":" <bl> <messageAddressList>
<ccFieldName> = "CC" | "Cc" | ...
<subjectField> = <subjFieldName> ":" <bl> [<marker> <bl>]*
                 <subject>
<marker> = <markerName> ":"
<markerName> = "Re" | "re" | "RE" | "Fwd" | "fwd" | "FWD" | ...
<subjFieldName> = "Subject" | "SUBJECT" | "Betreff" | ...
<nl> ... line break character
<bl> ... one or more blanks or tabs
<messageAddressLst> = <messageAddress> [, <messageAddress>]*
<messageAddress> = <addressee> "@" <domain>
<messageAddress> = "CN=" <common name> "/OU="
                   <organizationalUnit>
<messageAddress> = <quoted name> "<" <message address> ">"
<messageAddress> = ...
<bodyRepresentation> = <bodyLine> [<bodyLine>]*
<bodyLine> = <text> <nl>
where <text>, <addressee>, <domain>, <common name>,
```

<organizationalUnit>, and <quotedname> represent strings built from certain types of characters.

The left part is the result, and the right part gives a definition of what is understood by such result.

For instance, the second rule from above:
<messageAddress>=<addresssee>"@"<domain>
will be satisfied, i.e., an elementary mail segment is found when a parser finds something as it is defined on the right side of the rule "equation". In this case a message address is found within an incoming mail, when two strings representing the <addressee> and <domain> are detected that have the symbol '@' in the middle. An example would be "alice@domain1".

In case of normalization, in addition to parsing the patterns, the transducer creates a canonical format of the information in the header by mapping <b1> to a single blank and <XXX-Name> to the corresponding standard format (for example "Absender" to "From" or "Betreff" to "Subject"). Field values (e.g. message addresses) and message bodies are copied to the output by the transducer without modification.

Applied to our example it is easy to see that both header representations in M2 are covered by the regular expression. The top-most header corresponding to E2 has the following structure:
From: alice@domain1
To: bob@domain2
Subject: a question
<fromFieldName>":
"<b1><addressee>"@"<domain><n1>
<toFieldName>":"<b1><addressee>"@"<domain><n1>
<subjectFieldName>":
"<b1><marker><b1><subject>while the representation of M1's header in M2 looks as follows:
<addresse>"@"<domain><n1>
<toFieldName>":" <b1><addresse>"@"<domain><n1>
<subjectFieldName>":" <b1><subject>
Since the string covered by <subject> is the same for both header representations ("a question"), both are considered delimiters of elementary mail segments.

5.2. Computing the Key

Then, after having determined the split locations for all elementary mail segments E1, . . . , En and with reference back to FIG. 6, in a next step 420 for each elementary mail segment E1 the keys K1, . . . , Kn are computed. In this embodiment a key is encoded by a combination of above-mentioned contents of the "from" field, the "To" field, the "subject" field and optionally the time stamp.

For example the key 36 for M2 in the example in section 4.c,d is encoded by: bob@domain2//alice@domain1, chris@domain3, deirdre@domain4//Hi//05112004.05:12:37//Good, thanks!as an input.

Of course, other key combinations may be used as long as they serve to define a unique ID for an elementary mail segment.

5.3. Storing/Retrieving/Deleting of E-Mails

With reference back to FIGS. 4 and 6 the next step 430 is to store only the elementary mail segments E1, . . . , En. The redundant segments, i.e., segments which have already been stored, are removed and not stored again. In order to do that in an exemplary implementation it is required to find the smallest m such that there is no entry in the mail store table for Km. Only two different options a, b exist:
a. If there is no such m (i.e. all keys are in the mail store table): Let N be the node associated with Kn:
   i. If N does not have an attachment list, create a new attachment list for N and add all attachments of M to this list.
   ii. Otherwise: The e-mail was already requested to be stored, no further action is performed.
b. Otherwise: For each elementary mail segment j=m to n the following steps are performed:
   1. Create a new node N without an attachment list.
   2. Set the parent pointer of node N to the node associated with K(j−1) in the mail store table. (In absence of a parent node the parent pointer of K0 is defined to be NULL)
   3. Copy the content Ej of the j-th elementary mail segment into the respective content field of node N;
   4. Create a new entry in the mail store table which associates Kj with N, step 430.

When storing the e-mails according to this exemplary algorithm, the content of each elementary mail segment is stored exactly once and there are no redundancies. Moreover, through the parent pointers, it is possible to reconstruct the original e-mail as it was originally sent. In the example above, suppose e-mail M6 shall be reconstructed. If the node is known, where E6 (the "topmost", i.e., most recent, elementary mail segment of M6) is stored, one can reconstruct the original e-mail by concatenating the contents of this node and all ancestor nodes by going up the tree until the root is reached.

Next the reconstruction step 440 of an original e-mail according to this embodiment is described in more detail.

Reconstructing an e-mail from the discussion thread forest works somehow inversely to storing it, supposed the splitting begins with the past and ends in presence.

Given the key K of an elementary mail segment one can reconstruct the original e-mail on-the-fly as follows, see FIG. 8 for reference:
1. Step 4420: Lookup K in the mail store table, let N1 be the node associated with it
2. Steps 4430, 4440: Construct a sequence of nodes N1, . . . , Nm such that the parent pointer of N1 points to N(i+1) and the parent pointer of Nm is NULL. This is done in a loop and an IF statement as indicated in FIG. 8.
3. The concatenation 4460 of the content fields of N1, . . . , Nm then is the original e-mail for K.
4. If N1's node has an attachment list:
   a. Construct the attachment table of the original e-mail only from the attachment list of N1, i.e., copy all attachment IDs from N1's list into the new attachment table.
   b. Otherwise: This means that the e-mail ending with the elementary mail segment associated with N1 was never requested to be stored as such, but only through replies to this e-mail. Then, one can issue a message that an e-mail was requested to be restored although it was never explicitly requested to be stored in the first place and that thus reconstructing the attachments is not possible. Depending on the usage scenario one could return the attachments of all descendant nodes which is possibly a superset of the attachments of N1, or no attachments at all, if the attachments information is not important.
5. End of reconstruction, Return to step 450, FIG. 6

Thus, the original email is reconstructed by picking the current node and advancing through the concatenated list to the root node of the thread, thus moving from the presence into the past.

With reference back to FIGS. 4 and 6 the elementary mail segment E6 is concatenated with E4 and E1 to form the complete e-mail M6. Analogously, to reconstruct M5 we have to concatenate E5, E3, and E1. For reconstruction of M2, E2 and E1 have to be concatenated.

Finally, in step 450, the concatenated list of elementary mail segments is sent to the mail client 10, 12.

Additionally, an archiving procedure can be invoked, step 460, which archives the mail store table, as described above. By that the storage space requirements is decreased significantly compared to prior art.

Next, an optional deletion procedure is disclosed as follows:

When deleting an e-mail it is preferred to do more than simply delete the node containing the newest elementary e-mail, as this may also delete all replies to it. One should only delete such a newest elementary mail segment, which has no replies to it. Given the key K of an elementary mail segment, deletion may be implemented as follows:

1. Lookup K in the mail store table, let N1 be the node associated with it
2. Let N1, ..., Nm be the maximal sequence of nodes such that for each i: N1 is the parent of N(i−1). In particular, Nm has no parent, i.e., it is the root node of the discussion thread tree.
3. Find the biggest k such that for all i=1, ..., k: N1 has no other child nodes than N(i−1).
4. Delete the nodes N1, ..., Nk from the mail store table Of course, the inventional method can also be implemented at the client 10, see FIGS. 1 and 2, as at a client principally only a far smaller amount of mail traffic is present compared to that of the server, and all required information is present at the client.

Next, the handling of attachments for rich text e-mail systems is disclosed according to a specific embodiment of the inventional method.

It was mentioned above that the splitting algorithm applied for RFC822 e-mails cannot find out which attachment of an e-mail belongs to which elementary e-mail. However, in a rich text mail system (like Lotus Notes), there are textual references to the attachments in the e-mail body and thus, the splitting algorithm can determine which elementary e-mail has which respective attachments. In this case, it is always possible to add only those attachments to the attachment list of a node, which were indeed attached for the corresponding elementary e-mail (in the algorithm described above we stored all attachments of the overall e-mail ending with the elementary mail segment represented by the node). The following modifications of above-described procedures are proposed:

1. The procedure for storing is modified such that when creating a new node, the attachment list of the node is created in any case and that the attachments of the elementary mail segment in question are added to the list.
2. The reconstruction procedure changes in step 4 in that the overall attachment list is constructed by the set-union of all attachment lists of all elementary mail segments.
3. The deletion method remains unchanged.

Next, it will be demonstrated along with the example above, how the mail store table 30 (FIG. 4) and the tree structure is built.

The order of the e-mails in which they are stored in the system is assumed to be the following:

M1, M2, M3, M5, M6, M4. As above, the elementary mail segments E1, ..., E6 are assumed to be the most topmost—most recent—elementary e-mail of M1, ..., M6, respectively. Note that M6 and M4 are requested to be stored not in the order as they were sent.

Initially, the mail store table is empty, see FIG. 9A.

Then, M1 is received, it is split into its elementary mail segments (only one, namely E1) and a node is stored under its key K1 with the contents of E1, there is no parent pointer, and an empty attachment list because no attachments were sent, see FIG. 9B.

Next, M2 is sent. As may be appreciated it is a reply to M1 and, again, a node is created, a node with an empty attachment list which is linked to the node of M1 (containing E1), see FIG. 9C.

Then mail M3 is received. Here, similar steps are done as described above but all attachments of the complete e-mail in the attachment list of M3's node are stored, see FIG. 9D.

For M5, the steps are similar. But it should be noted that the node of M5 contains both attachments A1 and A2, i.e. the attachments of M5 are found directly at the M5 node and need not be reconstructed by traversing the tree up to the root, see FIG. 9E. When receiving M6, the situation is somewhat different from above because M4—the e-mail where M6 is an immediate reply to—is not already stored in the system. Thus, a node for M4 has to be created anyway although a request to store M4 is not yet received. Now, in the general case of RFC822 e-mail correspondence, one cannot infer the attachments of M4, it is only known that the M4 attachments are a superset of M1's attachments and a subset of M6 attachments. Thus, it is proposed not to create an attachment list for E4's node. Thus, the attachments for M4 remain undetermined. For M6, one can create this attachment list which contains A3, see FIG. 9F.

Finally, mail M4 is received. Since the node is already present, it is not necessary to create a new node. However, an attachment list for M4 is created since M4 doesn't have one yet, where the actual attachments we encounter (none in this case) are put in, see FIGS. 9F and 9G.

By that the whole discussion thread tree has been stored.

The present invention can be realized in hardware, software, or a combination of hardware and software. An e-mail processing tool according to the present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software could be a general purpose computer system with a computer program that, when being loaded and executed, controls the computer system such that it carries out the methods described herein.

The present invention can also be embedded in a computer program product, which comprises all the features enabling the implementation of the methods described herein, and which—when loaded in a computer system—is able to carry out these methods.

Computer program means or computer program in the present context mean any expression, in any language, code or notation, of a set of instructions intended to cause a system having an information processing capability to perform a particular function either directly or after either or both of the following a) conversion to another language, code or notation;
b) reproduction in a different material form.

The invention claimed is:

1. A method for processing e-mail messages in an electronic mail communication system comprising at least one mail server and a plurality of mail clients, comprising:
   receiving an incoming e-mail message by the at least one mail server, wherein the incoming e-mail message includes at least a message body;
   splitting up the message body of the incoming e-mail message before forwarding, wherein the splitting yields a plurality of elementary mail segments, and wherein the splitting is textually based;
   storing the plurality of elementary mail segments in a mail store table, wherein the incoming e-mail message in its original form is not stored on the at least one mail server, and wherein the plurality of elementary mail segments are non-redundantly stored in the mail store table;
   reconstructing the incoming e-mail from a concatenation of the plurality of elementary mail segments by the at least one mail server prior to forwarding the reconstructed concatenation;
   forwarding the reconstructed concatenation to at least one of the plurality of mail clients;

computing a unique ID for each of the plurality of elementary mail segments, wherein the unique ID is used as an index for accessing a mail store table, wherein the mail store table mail server;

looking up the computed unique ID of each elementary mail segment in said mail store table, wherein any redundancy of the plurality of elementary mail segments is removed, such that each of the plurality of elementary mail segments is stored exactly once; and in case the computed unique ID of an elementary mail segment does not exist in the mail store table, storing the elementary mail segment as a new entry in the mail store table together with a link to its particular parent elementary mail segment, thus defining one or more ordered sequences of inter-related elementary mail segments, wherein said unique ID is computed based on a combination of the following values:

the contents of the message header "from"-field,
a consistently used time stamp,
the contents of the message header "to"-field,
the contents of the message header "subject"-field, and
the body of the elementary mail segment.

2. The method of claim 1, wherein forwarding the reconstructed concatenation includes an operation selected from the group consisting of: forwarding the reconstructed concatenation to any of the plurality of mail clients, and performing a restore procedure from a mail archive based on the mail store table.

3. The method of claim 1, wherein the splitting up comprises:
splitting up the message body of the incoming e-mail message at one or more split locations by parsing the message body.

4. The method of claim 3, wherein the plurality of elementary mail segments stand at least pair wise in a first parent-child relationship wherein a child in the first parent-child relationship is a parent in at least a second parent-child relationship.

5. The method of claim in 3, wherein the splitting up comprises utilizing a first approach in a homogenous e-mail infrastructure, wherein the electronic mail communication system uses an internal representation that considers the message body as a structural entity reflected externally by a marker, wherein the marker is not part of the message body such that the splitting occurs in relation to the marker, and wherein the marker is a string or non-printing character.

6. The method of claim 4, wherein the parent-child relationship is defined between a first and a second elementary mail segment, if:
a) the second elementary mail segment comprises the contents of a reply to the first elementary mail segment, or
b) the second elementary mail segment comprises the contents of a mail forwarding the first elementary mail segment to a third mail receiver.

7. The method of claim 1, further comprising the steps of normalizing the message body and using said values e1) to e5) in a normalized form.

8. The method of claim 1, wherein the step of storing, comprises generating new entries into the mail store table, wherein
a) an entry is indexed by the unique ID and
b) the entry further comprises:
b1) a first field for the content of the elementary mail segment,
b2) a second field for a pointer to a parent entry in the mail store table, and
b3) a third field comprising a list of attachments.

9. The method of claim 1, further comprising the step of:
storing a list of attachments of an e-mail at a node representing its most recent elementary mail segment, as a list of attachment IDs.

10. A computing device program product for processing e-mail messages in an electronic mail communication system comprising at least one mail server and a plurality of mail clients using a computing device, the computing device program product comprising:

a non-transitory computer readable medium;

first programmatic instructions for receiving an incoming e-mail message by the at least one mail server, wherein the, incoming e-mail message includes at least a message body;

second programmatic instructions for splitting up the message body of the incoming e-mail message before forwarding, wherein the splitting yields a plurality of elementary mail segments, and wherein the splitting is textually based;

third programmatic instructions for storing the plurality of elementary mail segments in a mail store table, wherein the incoming e-mail message in its original form is not stored on the at least one mail server, and wherein the plurality of elementary mail segments are non-redundantly stored in the mail store table fourth programmatic instructions for reconstructing the incoming e-mail from a concatenation of the plurality of elementary mail segments by the at least one mail server prior to forwarding the reconstructed concatenation to at least one of the plurality of mail clients;

fifth programmatic instructions for forwarding the reconstructed concatenation, wherein the programmatic instructions are stored on the computer readable storage medium;

sixth programmatic instructions for computing a unique ID for each of the plurality of elementary mail segments, wherein the unique ID is used as an index for accessing a mail store table, wherein the mail store table provides access to each of the plurality of elementary mail segments stored at the at least one mail server;

seventh programmatic instructions for looking up the computed unique ID of each elementary mail segment in said mail store table, wherein any redundancy of the plurality of elementary mail segments is removed, such that each of the plurality of elementary mail segments is stored exactly once: and in case the computed unique ID of an elementary mail segment does not exist in the mail store table, eighth programmatic instructions for storing the elementary mail segment as a new entry in the mail store table together with a link to its particular parent elementary mail segment, thus defining one or more ordered sequences of inter-related elementary mail segments, wherein said unique ID is computed based on a combination of the following values:

the contents of the message header "from"-field,
a consistently used time stamp,
the contents of the message header "to"-field,
the contents of the message header "subject"-field, and
the body of the elementary mail segment.

11. The computing device program product of claim 10, wherein the second programmatic instructions for splitting up comprises:
splitting up the message body of the incoming e-mail message at one or more split locations by parsing the message body, wherein the plurality of elementary mail segments stand at least pair wise in a first parent-child relationship wherein a child in the first parent-child relationship is a parent in at least a second parent-child relationship.

12. The computing device program product of claim 11, wherein the splitting up comprises utilizing an approach selected from the group consisting of:
   a first approach in a homogenous e-mail infrastructure, wherein the electronic mail communication system uses an internal representation that considers the message body as a structural entity reflected externally by a marker, wherein the marker is not part of the message body such that the splitting occurs in relation to the marker, and wherein the marker is a string or non-printing character,
   a second approach in a heterogeneous message environment wherein a set of rules is created based on an existing set of representative e-mails that identify text patterns based on an assumption that representations of an e-mail header in the message body can be identified by a text pattern,
   a third approach that utilizes heuristics to take advantage of a plurality of relations between a plurality of representations of different headers in the message body,
   a fourth approach comprising parsing the message body based on regular grammar with a predetermined set of transduction rules, and
   a fifth approach comprising parsing the message body based on regular grammar with a predetermined set of transduction rules.

13. A system of computer hardware having at least a processor for processing e-mail messages in an electronic mail communication system comprising at least one mail server and a plurality of mail clients comprising:
   a receiving component for receiving an incoming e-mail message by the at least one mail server, wherein the incoming e-mail message includes at least a message body;
   a parser program component splitting up the message body of the incoming e-mail message before forwarding, wherein the splitting yields a plurality of elementary mail segments, and wherein the splitting is textually based;
   a program component for computing as unique ID for each of the plurality of elementary mail segments, wherein the unique ID is used as an index for accessing a mail store table, wherein the mail store table provides access to each of the plurality of elementary mail segments stored at the at least one mail server, and for looking up the computed unique ID of each elementary mail segment in said mail store table, wherein any redundancy of the plurality of elementary mail segments is removed, that each of the plurality of elementary mail segments is stored exactly once; and
   storage table means for storing the plurality of elementary mail segments in the mail store table, wherein the incoming e-mail message in its original form is not stored on the at least one mail server, and wherein the plurality of elementary mail segments are non-redundantly stored in the mail store table, and for storing the elementary mail segment as a new entry in the mail store table together with a link to its particular parent elementary mail segment in case the computed unique ID of an elementary mail segment does not exist in the mail store table, thus defining one or more ordered sequences of inter-related elementary mail segments, wherein said unique ID is computed based on a combination of the following values:
   the contents of the message header "from"-field,
   a consistently used time stamp,
   the contents of the message header "to"-field,
   the contents of the message header "subject"-field, and
   the body of the elementary mail segment
   a reconstruction component for reconstructing the incoming e-mail from a concatenation of the plurality of elementary mail segments by the at least one mail server prior to forwarding the reconstructed concatenation to at least one of the plurality of mail clients; and
   a forwarding component for forwarding the reconstructed concatenation.

* * * * *